United States Patent
Chaudhary et al.

(10) Patent No.: US 11,365,291 B2
(45) Date of Patent: Jun. 21, 2022

(54) CONTINUOUS PROCESS FOR POLYMER/FIBER MOLDING COMPOUNDS USING POLYMER DISPERSIONS

(71) Applicant: Dow Global Technologies LLC, Midland, MI (US)

(72) Inventors: Amit K. Chaudhary, Midland, MI (US); Eric L. Marchbanks, Sanford, MI (US)

(73) Assignee: Dow Global Technologies LLC, Midland, MI (US)

(*) Notice: Subject to any disclaimer, the term of this patent is extended or adjusted under 35 U.S.C. 154(b) by 534 days.

(21) Appl. No.: 15/324,460

(22) PCT Filed: Aug. 5, 2015

(86) PCT No.: PCT/US2015/043702
§ 371 (c)(1),
(2) Date: Jan. 6, 2017

(87) PCT Pub. No.: WO2016/025252
PCT Pub. Date: Feb. 18, 2016

(65) Prior Publication Data
US 2017/0198106 A1   Jul. 13, 2017

Related U.S. Application Data

(60) Provisional application No. 62/035,730, filed on Aug. 11, 2014.

(51) Int. Cl.
| | | |
|---|---|---|
| C08J 3/05 | (2006.01) |
| B29B 7/00 | (2006.01) |
| B29B 7/90 | (2006.01) |
| B29B 7/48 | (2006.01) |
| B29C 43/00 | (2006.01) |
| B29C 43/02 | (2006.01) |
| C08J 5/04 | (2006.01) |
| B29K 63/00 | (2006.01) |
| B29K 307/04 | (2006.01) |
| C08L 63/00 | (2006.01) |
| C08J 3/03 | (2006.01) |

(52) U.S. Cl.
CPC .............. C08J 3/05 (2013.01); B29B 7/007 (2013.01); B29B 7/48 (2013.01); B29B 7/90 (2013.01); B29C 43/003 (2013.01); B29C 43/02 (2013.01); C08J 3/03 (2013.01); C08J 5/042 (2013.01); C08L 63/00 (2013.01); B29K 2063/00 (2013.01); B29K 2307/04 (2013.01); C08J 2363/00 (2013.01); C08J 2363/04 (2013.01)

(58) Field of Classification Search
CPC ........ C08L 63/00–10; C09D 163/00–10; C09J 163/00–10; C08J 2363/00–10; C08J 3/03; C08J 3/05; C08J 5/042; C08J 5/043; C08J 5/04–044; B29B 7/90; B29B 7/007
See application file for complete search history.

(56) References Cited

U.S. PATENT DOCUMENTS

| | | | |
|---|---|---|---|
| 4,420,512 A | 12/1983 | Ogawa et al. | |
| 4,477,610 A * | 10/1984 | Ishimura | C08F 299/026 523/409 |
| 7,005,185 B2 | 2/2006 | Li et al. | |
| 8,658,736 B2 | 2/2014 | Honda et al. | |
| 2006/0128895 A1 | 6/2006 | Aisenbrey | |

FOREIGN PATENT DOCUMENTS

| | | |
|---|---|---|
| EP | 0180863 A2 | 5/1986 |
| EP | 0196476 A2 | 10/1986 |
| GB | 1380108 A | 1/1975 |
| WO | 9604416 A1 | 2/1996 |
| WO | 2005080481 | 9/2005 |
| WO | 2009002671 A1 | 12/2008 |
| WO | 2013122847 A1 | 8/2013 |
| WO | 2013122848 A1 | 8/2013 |
| WO | 2015023615 A1 | 2/2015 |

* cited by examiner

Primary Examiner — Kregg T Brooks

(57) ABSTRACT

A method for processing a thermoset resin mixed with inorganic fibers; said method comprising combining a thermoset resin, an inorganic fiber and water to produce a dispersion.

4 Claims, No Drawings

CONTINUOUS PROCESS FOR POLYMER/FIBER MOLDING COMPOUNDS USING POLYMER DISPERSIONS

BACKGROUND

This invention relates generally to a process for preparing a molding composition containing inorganic fibers and a thermoset resin.

Typically, formulating a fiber-based molding compound by mixing the fibers with a thermoset resin requires a high temperature to maintain manageable viscosity of the molding compound. High temperatures can lead to decreased stability of the thermoset resin. High viscosity can limit the fiber content of the molding compound. U.S. Pub. No. 2006/0128895 discloses a molding compound made from fibers and a thermoset resin, but does not suggest any solution to the aforementioned problems.

A polymer/fiber molding compound having decreased viscosity and better stability would be advantageous.

STATEMENT OF INVENTION

The present invention is directed to a method for processing a thermoset resin mixed with inorganic fibers. The method comprises combining a thermoset resin, an inorganic fiber and water to produce a resin and fiber dispersion.

DETAILED DESCRIPTION

All percentages are weight percentages ("wt %") and temperatures in ° C., unless otherwise indicated. A thermoset resin is an organic material that can be cured irreversibly to form an insoluble polymer network, typically by heating or by adding a reactive catalyst. Preferably, the resin is liquid at a temperature from 20 to 100° C. Thermoset resins include, e.g., epoxy resins, polyester resins and vinyl ester resins. A preferred thermoset resin is an epoxy resin. Preferably, an epoxy resin is a condensate of epichlorohydrin and a diol or polyol. Preferably, an epoxy resin is an aromatic epoxy resin, preferably a bisphenol A resin, a novolac epoxy resin or an oxazolidone epoxy resin. Preferably, the epoxy resin has an epoxy equivalent weight (g/equivalent) from 200 to 1500, preferably at least 225, preferably at least 250; preferably no more than 800, preferably no more than 600.

Examples of an inorganic fiber include carbon fiber and glass fiber. A preferred fiber is carbon fiber. Continuous and/or chopped fibers may be used. Preferably, the diameter of the fibers is from 3 to 20 microns, preferably at least 4 microns, preferably at least 5 microns; preferably no more than 15 microns, preferably no more than 10 microns. Preferably, the average length of chopped fibers (arithmetic average) is from 0.1 to 50 mm, preferably at least 0.5 mm, preferably at least 1 mm; preferably no more than 25 mm, preferably no more than 15 mm.

Preferably, at least one thermoset resin is dispersed in water to produce an aqueous resin dispersion prior to mixing with the fiber. Preferably, the concentration of the resin in the aqueous resin dispersion is from 30 to 70 wt %, preferably from 45 to 65 wt %, preferably from 50 to 60 wt %. Preferably, at least one surfactant is added to aid in dispersing the thermoset resin. Preferably, the surfactants are present in the aqueous resin dispersion in a total amount from 1 to 15 wt %, preferably from 2 to 12 wt %, preferably from 2 to 10 wt %, preferably from 2.5 to 8 wt %, preferably from 3 to 6 wt %. Preferably, the aqueous resin dispersion comprises a cationic surfactant in an amount from 2 to 10 wt %, preferably from 2 to 8 wt %, preferably from 2.5 to 5 wt %. Preferably, the dispersion comprises an ethoxylated fatty amine surfactant in an amount from 0.2 wt % to 5 wt %, preferably from 0.5 wt % to 3 wt %, preferably from 0.7 wt % to 2 wt %. Preferably, the thermoset resin is an epoxy resin. Preferably, the aqueous dispersion comprises a novolac epoxy resin in an amount from 5 to 65 wt %, preferably at least 10 wt %, preferably at least 20 wt %; preferably no more than 50 wt %, preferably no more than 35 wt %.

Preferably, the combined aqueous resin dispersion and fiber (resin and fiber dispersion) comprises from 30 to 60 wt % fiber (based on total weight of the resin and fiber dispersion), preferably at least 35 wt %, preferably at least 37 wt %, preferably at least 39 wt %, preferably at least 41 wt %, preferably at least 43 wt %; preferably no more than 55 wt %, preferably no more than 53 wt %, preferably no more than 51 wt %.

The resin and fiber dispersion may contain other additives, including, e.g., mold release agents, toughening agents (rubbery materials), catalysts and hardeners.

When the thermoset resin is an epoxy resin, an epoxy curing agent is added as a catalyst. An epoxy curing agent is any catalyst capable of curing a resin having epoxy functionality at a temperature from 20 to 200° C. Preferably, the catalyst contains amine functionality. Preferably, amine curing agents include polyfunctional amines. Preferably the amine curing agent comprises an amine-containing polymer (including low molecular weight polyethyenimines, e.g., triethylene tetramine) or a compound having an imidazole ring (e.g., 2-ethyl-4-methylimidazole). Preferably the epoxy curing agent is a combination of a hardener and a catalyst, said combination promoting cure of the epoxy resin only when activated at a high temperature, e.g., above 120° C., preferably above 130° C.; preferably no greater than 180° C. A preferred example of a catalyst/hardener combination is the combination of a dicyandiamide and a blocked urea. Epoxy curing agents are well known in the art and are described, e.g., in WO 2005/080481. When the thermoset resin is a resin having polymerizable ethylenic functionality, preferably the catalyst is a free-radical polymerization initiator, e.g., peroxides, azo compounds, persulfate.

Preferred mixing devices for producing the dispersion of this invention include, e.g., extruders (e.g., twin screw, single screw) or other variants (Farrel continuous mixers, Teledyne continuous mixers, Banbury mixers, batch mixers). Preferably, the temperature of the aqueous resin dispersion when it is mixed with the fiber is from 20 to 100° C., preferably at least 25° C., preferably at least 30° C., preferably at least 35° C., preferably at least 40° C., preferably at least 45° C.; preferably no greater than 95° C., preferably no greater than 85° C., preferably no greater than 80° C., preferably no greater than 75° C. At these temperatures, polymerization does not occur or occurs only to a very limited extent.

Preferably, water is removed from the mixture of aqueous resin dispersion and fiber during the mixing process, e.g., in a twin screw extruder. Preferably, the residual water level in the resin/fiber mixture is less than 5 wt %, preferably less than 2 wt %, preferably less than 0.5 wt %. Catalyst and/or hardener for the resin may be added before or after removal of water. Preferably, after removal of water, the final resin/fiber mixture is extruded.

After extrusion, the final resin/fiber mixture may be molded into any form, e.g., pellet, log, sheet, briquette, etc. The molded resin/fiber mixture is cured by heating, as described above.

EXAMPLES

An aqueous dispersion of the epoxy resin blend is prepared as described in Table 1 at a temperature between 100 and 150° C., then cooled to ambient temperature. D.E.R.™ 6508 and D.E.N. 438 are epoxy resins produced by The Dow Chemical Company. D.E.R. 6508 is a Bisphenol A, epichlorohydrin and methylenediphenylene diisocyanate polymer and D.E.N. 438 is a liquid epoxy resin based on reaction product of phenol-formaldehyde Novolac with epichlorohydrin. The hardener and catalyst are TECHNICURE NanoDicy dicyandiamide from AC Catalysts and OMICURE U-410M toluene bis dimethyl urea from Emerald Performance Materials, respectively. E-PEG 4600 is cationic surfactant produced by The Dow Chemical Company and ETHOX TAM-20 DQ is produced by Ethox Chemicals.

TABLE 1

Composition of aqueous dispersion of epoxy resin.

| Component of Resin Formulation | Weight % |
| --- | --- |
| D.E.R. 6508 | 27.3 |
| D.E.N. 438 | 27.3 |
| E-PEG | 3.3 |
| TAM-20 DQ | 1.1 |
| Water | 41.0 |

Extrusion Process/Sample Prep

The aqueous dispersion of Table 1 is then introduced into a twin screw extruder along with carbon fiber, catalyst and hardener to prepare an epoxy-carbon fiber random composite charge (details in Table 2). The temperature in the fiber mixing section is maintained from 40 to 70° C., depending on the weight fraction of fiber and the mixing speed. In the water removal section, the temperature is from 90 to 100° C. The epoxy-carbon fiber composites are prepared in a 25 mm TSE and collected in the shape of a cylindrical log.

TABLE 2

Composition of random composite charge prepared in a 25 mm Twin Screw Extruder.

| Components of composite | Weight % |
| --- | --- |
| D.E.R. 6508 | 20.75 |
| D.E.N. 438 | 20.75 |
| E-PEG | 2.5 |
| TAM-20 DQ | 0.8 |
| Technicure NanoDicy | 3.5 |
| Omicure U-410M | 1.7 |
| Carbon Fiber | 50.0 |

The random composite charge prepared using the continuous extrusion process is then subjected to compression molding process as mentioned below:

The composite charge prepared in the example above are compression molded into 10"×10"×⅛" (30.5 cm×30.5 cm×0.3 cm) flat plaques by first preheating about 350 g charges to 70±10° C., followed by placing the charge in between the mold within a Lih Woei (300 Ton) compression molder preheated to 150° C. The mold was closed to a load of 25000 lbs (200×10$^5$ N/m$^2$) for 5 min. The composite is immediately demolded (@150° C.).

The invention claimed is:

1. A method for processing a thermoset resin mixed with inorganic fibers; said method comprising a) combining a thermoset resin comprising at least one epoxy resin, wherein at least one epoxy resin is an oxazolidone epoxy resin, and water to produce an aqueous resin dispersion, b) at a temperature of 20 to 95° C., combining said aqueous resin dispersion in an extruder with an inorganic fiber having an arithmetic average length of 0.1 to 50 mm to form an aqueous resin and fiber dispersion, c) in the extruder, removing water from the aqueous resin and fiber dispersion to produce a molding compound having a residual water content of less than 2 wt %, d) before or after step c), adding an epoxy curing agent comprising a hardener and a catalyst to the extruder, wherein the hardener is dicyandiamide and the catalyst is a blocked urea and e) extruding the molding compound.

2. The method of claim 1 in which the inorganic fiber is carbon fiber or glass fiber.

3. The method of claim 2 in which the thermoset resin comprises from 30 to 70 wt % of the aqueous resin and fiber dispersion.

4. The method of claim 3 in which the aqueous resin and fiber dispersion comprises from 30 to 60 wt % fiber.

* * * * *